(12) United States Patent
Ochomogo et al.

(10) Patent No.: US 8,495,971 B2
(45) Date of Patent: Jul. 30, 2013

(54) ANIMAL LITTER COMPRISING A SURFACTANT ENCAPSULATED FRAGRANCE NANOEMULSION

(75) Inventors: Maria G. Ochomogo, Pleasanton, CA (US); Elizabeth Donald, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 150 days.

(21) Appl. No.: 12/963,276

(22) Filed: Dec. 8, 2010

(65) Prior Publication Data

US 2012/0145086 A1    Jun. 14, 2012

(51) Int. Cl.
*A01K 29/00*    (2006.01)

(52) U.S. Cl.
USPC .......................................... 119/171; 119/173

(58) Field of Classification Search
USPC ................................... 119/171–173
See application file for complete search history.

(56) References Cited

U.S. PATENT DOCUMENTS

| | | | | | |
|---|---|---|---|---|---|
| 3,971,852 | A | * | 7/1976 | Brenner et al. | 426/103 |
| 4,227,364 | A | * | 10/1980 | Scherbring | 56/10.8 |
| 4,407,231 | A | * | 10/1983 | Colborn et al. | 119/173 |
| 4,428,869 | A | * | 1/1984 | Munteanu et al. | 512/4 |
| 4,576,737 | A | * | 3/1986 | Johnson | 512/4 |
| 4,949,672 | A | * | 8/1990 | Ratcliff et al. | 119/173 |
| 5,016,568 | A | * | 5/1991 | Stanislowski et al. | 119/173 |
| 5,018,482 | A | * | 5/1991 | Stanislowski et al. | 119/173 |
| 5,135,743 | A | * | 8/1992 | Stanislowski et al. | 424/76.6 |
| 5,183,655 | A | * | 2/1993 | Stanislowski et al. | 424/76.6 |
| 5,189,987 | A | * | 3/1993 | Stanislowski et al. | 119/171 |
| 5,290,547 | A | * | 3/1994 | Bilbrey | 424/76.6 |
| 5,489,427 | A | * | 2/1996 | Bilbrey | 424/76.6 |
| 5,860,391 | A | * | 1/1999 | Maxwell et al. | 119/173 |
| 5,912,220 | A | * | 6/1999 | Sramek et al. | 510/284 |
| 6,045,635 | A | * | 4/2000 | Ogasa | 148/678 |
| 6,365,636 | B1 | * | 4/2002 | Chowhan et al. | 514/64 |
| 2003/0194416 | A1 | * | 10/2003 | Shefer et al. | 424/401 |
| 2006/0222766 | A1 | * | 10/2006 | Muller et al. | 427/213.3 |
| 2009/0126644 | A1 | * | 5/2009 | Thomas et al. | 119/171 |
| 2009/0208541 | A1 | * | 8/2009 | Gesztesi et al. | 424/401 |
| 2010/0249014 | A1 | * | 9/2010 | Denome et al. | 512/4 |

* cited by examiner

*Primary Examiner* — Kristen C Hayes
(74) *Attorney, Agent, or Firm* — Ann Lee

(57) ABSTRACT

The present invention is directed to litter compositions including a litter substrate in the form of granules and a stable fragrance coating applied over at least some of the litter granules. The stable fragrance coating provides a fragrance litter composition exhibiting no or a reduced tendency for fragrance to be lost over time. Furthermore, the fragrant litter composition is able to reform a stable fragrance coating after being wetted, upon redrying. The stable fragrance coating comprises a nanoemulsion including an aqueous surfactant continuous phase and a dispersed phase comprising one or more fragrance oils. The fragrance oil is dispersed within the continuous phase as nano-sized droplets having an average diameter of no more than about 100 nm.

18 Claims, 3 Drawing Sheets

ANIMAL LITTER COMPRISING A SURFACTANT ENCAPSULATED FRAGRANCE NANOEMULSION

BACKGROUND OF THE INVENTION

1. The Field of the Invention

The present invention relates to litter for use by domestic animals. For example, such litter is typically employed by pet owners to absorb urine and collect feces.

2. Background and Relevant Art

Many people enjoy the company of one or more domestic pets. Litter boxes are typically provided for the use of such animals in the collection of urine and feces. Such a litter box is typically filled with an absorbent granular material (e.g., sand and/or clay), which aids in collecting the bodily wastes produced by pets. Such litter materials often include a fragrance component (e.g., a fragrance oil) to mask the odor associated with such waste. Such fragrance components are often applied encapsulated within a starch which provides improved stability to the fragrance as compared to the fragrance oil alone. One difficulty associated with such litters including an encapsulated fragrance is that such encapsulated fragrances are not very good at regulating release of the fragrance over time, particularly once the encapsulated fragrance is first wetted. As a result, fragrance is unavoidably lost after a relatively short time, particularly after initial wetting. The continuous relatively high rate of fragrance loss even during storage is problematic as such products may be stored for significant periods of time between manufacture and final use by the consumer. Furthermore, upon wetting (e.g., by urine and/or animal feces), the starch encapsulation of the fragrance oil or other component is broken, after which there is little or no ability to further control release of the fragrance component. The result is that the fragrance associated with the litter composition is quickly lost.

BRIEF SUMMARY OF THE INVENTION

The present invention is directed to litter compositions comprising a litter substrate in the form of granules and a fragrance coating disposed over at least some of the litter substrate granules. The fragrance coating advantageously comprises a water-soluble nanoemulsion including an aqueous surfactant continuous phase and a dispersed phase comprising one or more fragrance oils. The fragrance oil is present within the nanoemulsion as nano-sized droplets dispersed within the continuous phase so that the aqueous continuous phase encapsulates the fragrance oil nano-droplets. The fragrance oil droplets have an average diameter of no more than about 100 nm, preferably no more than about 50 nm. The nanoemulsion is dried so as to remove at least a portion of the water, resulting in a stable fragrance coating that adheres over the litter substrate granules.

The nanoemulsion is water soluble and remains on the litter substrate granules as a relatively thin film after drying. The nanoemulsions have been found to exhibit a relatively large isotropic region so that the nanoemulsion coating remains substantially clear or translucent as a result of the extremely small droplet size (i.e., visible light is not scattered by such small droplets of the nanoemulsion). Although not bound to any particular theory, it is believed that the surfactant included within the aqueous continuous phase acts to destabilize the liquid "crystalline" oil phase. The surfactant disturbs lamellar packing within the oil phase, facilitating formation of nano-sized droplets characterized by very high curvature. Such nano-sized droplets having high curvature (as a result of the nano-sized diameters) result in a substantial change in free energy and thermodynamic stability. The resulting nanoemulsion is stable. For example, most emulsions area easily broken upon dilution, drying, boiling, or addition of an electrolyte. In contrast, the present nanoemulsion is substantially more stable so that, upon drying the fragrance, oil is not readily volatilized away, even upon wetting and redrying. Furthermore, the resulting nanoemulsion exhibits water solubility and relatively low viscosity so that application by spraying is easily possible.

The fragrance nano-emulsion is applied (e.g., by spraying) onto the litter substrate granules. The inventors have found that upon drying there is little or no detectable fragrance associated with the coated litter substrate granules, but upon wetting (e.g., urine and/or liquid associated with fresh feces), a relatively strong release of fragrance is detected. Furthermore, the coated litter substrate granules redry so as to reassume a stable coating in which volatilization of the fragrance oil is minimized or prevented until rewetting. The stability of the coating allows subsequent rewetting followed by release of fragrance. Advantageously, the fragrance release in subsequent wetting is not significantly diminished as compared to the first instance of wetting.

In one embodiment, the litter composition further includes a borate. Borates are advantageously included to inhibit the urease enzyme so as to minimize production and release of ammonia and carbon dioxide upon decomposition of urea. The borate (e.g., boric acid or a borate salt) may be included within the aqueous continuous phase of the nanoemulsion. The inventors have found that borates are capable of complexing with the surfactant(s) of the aqueous continuous phase to further stabilize the components of the nanoemulsion, resulting in a much more flexible, plasticized (i.e., as opposed to brittle) coating formed over the litter substrate granules than would be formed by the borate alone. The combination of borate with the aqueous surfactant components thus increases the stability of the nanoemulsion, aids in suspension, thickening, and adherence of the nanoemulsion to the substrate upon drying, and may also enhance the efficacy of the borate in inhibiting release of ammonia.

Additional features and advantages of exemplary implementations of the present invention will be set forth in the description which follows, and in part will be evident from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

I. Introduction

Figure 1A:
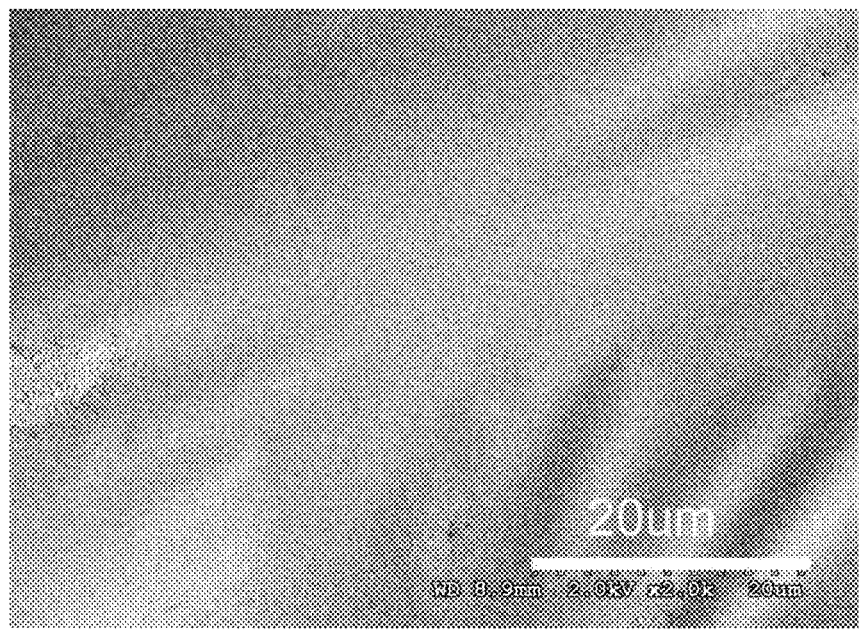
FIG. 1A is an SEM image of an exemplary fragrance nanoemulsion applied over a glass substrate.

The present invention is directed to litter compositions including a litter substrate in the form of granules and a stable fragrance coating applied over at least some of the litter granules. The fragrance coating is stable so as to provide a fragrance litter composition exhibiting no or a reduced tendency for fragrance to be lost over time, even upon wetting and subsequent redrying. For example, the fragrant litter composition is able to reform a stable fragrance coating after being wetted, upon subsequent redrying. These characteristics greatly improve the ability of the litter composition to effectively mask and minimize waste odors associated with use of a litter box. The stable fragrance coating comprises a nanoemulsion coated over at least some of the litter substrate granules. The nanoemulsion includes a continuous phase comprising an aqueous surfactant and a dispersed phase comprising one or more fragrance oils. The fragrance oil is dispersed within the continuous phase as nano-sized droplets having an average diameter of no more than about 100 nm, preferably no more than about 50 nm. The nanoemulsion is clear or translucent, and is advantageously water soluble and of relatively low viscosity (e.g., no more than about 200 cP, typically between about 1 and about 150 cP) so that application by spraying is easily accomplished.

II. Exemplary Litter Compositions

The litter composition comprises a litter substrate in the form of granules. Any suitable litter substrate known in the art may be used. Exemplary substrate granule materials include but are not limited to sand, limestone, clay, silica gel, and/or natural organic materials such as those resulting as byproducts of agricultural operations. Such agricultural byproducts are typically cellulosic materials, examples of which include, but are not limited to, wood, corn, wheat, tea leaves, walnut shells, or grasses. Litter substrate granules may be clumping or non-clumping, as desired. One non-limiting example of a clumping litter substrate material is bentonite clay, which clumps together when wetted so as to form a solid mass separate from the other litter within a litter box. The clumped material can be scooped out and disposed of without requiring replacement of all litter within the litter box. In one embodiment, the litter substrate granules may comprise active carbon, which aids in absorption of odors. Additional optional components of the litter substrate granules will be known to those of skill in the art. Particle size for such litter substrate granules may typically range between about 0.2 mm and about 10 mm, more typically between about 0.3 mm and about 8 mm, and most typically between about 0.5 mm and about 4 mm.

At least some of the litter substrate granules are coated with a fragrance containing nanoemulsion. The nanoemulsion is formed by combining a fragrance oil, water, and one or more surfactants so as to form a stable, water-soluble nanoemulsion. The fragrance oil becomes the dispersed phase, while the water and surfactant(s) form a continuous aqueous phase within which nano-sized droplets of fragrance oil are dispersed. Preparation of the nanoemulsion may be accomplished by any suitable method, examples of which include kinetic methods (e.g., high shear mixing), by low or no input energy techniques such as inducing a phase transition during emulsification, or any other method. For example, phase inversion concentrates (PIC) micro-emulsions may be diluted, inducing a phase inversion so as to result in the desired nanoemulsion. The ingredients of the composition, concentration used and order of addition may be varied to induce the desired phase inversion so as to result in nano-size droplets.

The nanoemulsion includes the fragrance oil as a dispersed phase within the aqueous surfactant continuous phase. Additional components, for example, a co-surfactant to aid in hydrophilizing the fragrance oil and/or a co-solvent to hydrophobize the aqueous phase may also be included. Examples of co-solvents include, but are not limited to, $C_2$-$C_{16}$ alcohols (e.g., ethanol, propanol, butanol, pentanol, glycerol or mixtures and/or isomers thereof). Other non-limiting examples of suitable co-solvents include glycerin, 1,3-propanediol, ethylene glycol and propylene glycol or mixtures thereof. Sugar alcohols (e.g., manitol, sorbitol, xylitol, or mixtures thereof) may also be suitable. When present, the co-solvents preferably comprise about 0.1% to about 30% by weight of the composition, preferably about 0.5% to about 20%, and most preferably about 0.5% to about 12%.

Preferably the surfactant of the continuous phase comprises a hydrophilic non-ionic surfactant having a hydrophilic-lipophilic balance (HLB) value of at least about 10 that may be solvated by water and oil. The higher the HLB value, the more lipophilic (and less hydrophilic) the surfactant. Exemplary hydrophilic non-ionic surfactants include polysorbates and polyols. Examples of surfactants and co-surfactants are described in McCutcheon's Emulsifiers and Detergents (1997), Kirk-Othmer, Encyclopedia of Chemical Technology 3rd Ed., Volume 22, pp. 332-432 (Marcel-Dekker, 1983), and McCutcheon's Soaps and Detergents (N. Amer. 1984), the contents of which are hereby incorporated by reference. Exemplary nonionic surfactants are low molecular weight $C_6$ to $C_{12}$ alkyl polyglycosides, ethylene oxide and mixed ethylene oxide/propylene oxide adducts of alkylphenols, the ethylene oxide and mixed ethylene oxide/propylene oxide adducts of long chain alcohols or of fatty acids, mixed ethylene oxide/propylene oxide block copolymers, esters of fatty acids and hydrophilic alcohols. Exemplary anionic surfactants are the soaps, alkylbenzene sulfonates, olefin sulfonates, parafin sulfonates, alcohol and alcoholether sulfates, phosphate esters, and the like. Suitable alkyl diphenyl oxide disulfonates preferably include an alkyl chain group of $C_6$-$C_{12}$. Alkyl diphenyl oxide disulfonates are available from Dow under the brand name DOWFAX® or from Pilot Chemical under the brand name CALFAX®. Illustrative cationic surfactants include amines, amine oxides, alkylamine ethoxylates, ethylenediamine alkoxylates such as the Tetronic series from BASF, quaternary ammonium salts, and the like. Some suitable surfactants may have both acidic and basic groups in their structure, such as amino and carboxyl radicals or amino and sulfonic radicals, or amine oxides and the like. Suitable amphoteric surfactants may include, but are not limited to, betaines, sulfobetaines, imidazolines, and the like.

Polyols refer to a class of materials having at least two —OH groups which are not in trans configuration relative to each other. Such polyols may be linear, cyclic, aromatic, and/or optionally substituted so long as the resulting structure is water soluble, particularly upon complexing with an optional borate component. One such class of preferred polyols include sugar alcohols and/or sugar acids such as mannitol, sorbitol, glycerin, and propylene glycol. Particularly preferred examples include glycerin and propylene glycol.

The one or more surfactants may comprise between about 0.1 percent and about 25 percent by weight of the nanoemulsion, more preferably between about 1 percent about 15 percent, and most preferably between about 2 percent and about 10 percent by weight of the nanoemulsion. The particular surfactant(s) selected, as well as its amount may depend on the hydrophobicity of the fragrance oil, and the amount of included oil, as well as other factors. For example, relatively more hydrophobic fragrance oils may require more surfactant than less hydrophobic oils.

The nanoemulsion includes nano-sized droplets of the fragrance oil rather than micron or larger sized droplets associated with other types of emulsions. For example, the droplets may have an average diameter of no more than about 100 nm, more preferably no more than about 50 nm, and more typically within a range between about 20 nm and about 30 nm. The term "diameter" is used broadly, and does not require that the droplets be spherical, as the droplets may assume whatever shape is dictated by the particular surfactant(s) within the aqueous continuous phase, as well as the characteristics of the fragrance oil(s) selected. As such, "diameter" may be interchanged with "size" or "thickness" and refers to the thickness dimension of such droplets. Such small droplets are characterized by very high surface area to volume ratios, which requires less fragrance for equal performance, and is also believed to result in increased efficiency of any included borate (i.e., less borate, for example 60-70% less may be required as compared to compositions that are not characterized by nano-sized droplets). This is a result of the nano-sized droplets having significantly greater surface area to volume ratio.

The fragrance oil may comprise between about 0.1 percent and about 75 percent by weight of the nanoemulsion, between about 5 percent and about 60 percent, between about 10 percent and about 55 percent, between about 1 percent and about 10 percent, and between about 1 percent and about 5 percent by weight of the nanoemulsion. In one embodiment, the fragrance oil comprises about 50 percent by weight of the nanoemulsion, while the other 50 percent comprises the aqueous continuous phase, which includes the surfactant and optionally one or more additional co-surfactants, co-solvents, borates, and/or other additives. The balance of the aqueous continuous phase may comprise water. In another embodiment, a first part including the fragrance oil (e.g., including the fragrance oil, and optionally other components such as a surfactant blend, co-solvents, etc.) may comprise 30 percent to 50 percent of the nanoemulsion. The balance may comprise the aqueous continuous phase, which may include co-surfactants, co-solvents, borate, etc. Such an example is described below in Example 4.

In one embodiment the nanoemulsion includes one or more borates. Borates are advantageously included to inhibit the urease enzyme so as to minimize production and release of ammonia resulting from biodegradation of the urea within urine and/or feces. In one embodiment, the borate may be included within the aqueous continuous phase as boric acid or a borate salt (e.g., an alkali and/or alkaline earth borate salt). Examples of alkali and or alkaline earth borate salts include, but are not limited to sodium borate, potassium borate, magnesium borate, and/or calcium borate. Another suitable example of a borate salt may include manganese borate. Such borate salts may of course be present in hydrated form. The inclusion of a borate is advantageous not only as it inhibits the urease enzyme, but the inventors have also found that borates are capable of complexing with the polyol and/or other included surfactant(s) of the continuous phase to further stabilize the components of the nanoemulsion, resulting in a much more flexible, plasticized (i.e., non-brittle), and stable coating formed over the litter substrate granules than would be formed by the borate alone. In one embodiment, the molar ratio of the borate component to the polyol component is between about 1:1 and about 1:15, more preferably between about 1:1 and about 1:8.

Borates crosslink with the polyols or alcohols to act as a plasticizer to stay on the surface and quickly dry without penetrating into the clay interior. For example, without the plasticizer effect, fragrance sprayed onto the clay would be absorbed into the center of the clay and will not be available upon wetting by urine to be released to the air. Including both the borate and the polyol—which cross link together—reduces or eliminates adsorption of the fragrance into the interior of the clay. Furthermore, it aids in the drying process on the surface of the clay. This feature is very advantageous, particularly when used in conjunction with active carbon within the litter substrate. Specifically, the combination forms a plastic sleeve or coating on the exterior of the litter substrate which is able to both release the fragrance in a controlled manner (i.e., only upon wetting, and re-sealing the fragrance after drying until subsequent re-wetting) while permitting the active carbon to absorb the odor.

As mentioned, the litter substrate granules may comprise active carbon, which aids in absorption of odors. One difficulty associated with existing litter compositions including active carbon and a fragrance is that the active carbon tends to absorb the fragrance oil as well as undesirable odors. Absorption of the fragrance oil by the active carbon is undesirable, and contributes to the overall ineffectiveness of existing fragranced litters. In contrast, the inventors have found that the nanoemulsions including the fragrance oil are not absorbed by the active carbon of the substrate. Rather, the nanoemulsion forms a coating over the pores of the active carbon which shield or minimize absortion by the active carbon (of undesirable or other odors) until dispersion of the thin film coating by wetting. Upon exposure to liquid, the coating over the active carbon is disturbed so as to expose the pores of the active carbon, allowing absorption of such odors for as long as the material is wetted. Upon redrying, the thin film coating reforms over the active carbon until subsequent rewetting. Thus, effectiveness and selectivity of the active carbon is also improved by use of the nanoemulsion fragrance compositions.

Finally, the borate serves an additional purpose as well. A solution of borate-polyol dries into nano-size droplets and due to the enhancement of the surface area per volume ratio, significantly less (e.g., about 30% less, 50% less, or even 60% to 70% less) borate is needed to inhibit the urease enzyme, thus reducing the odor with less borate.

III. Examples

Without limitation, the following actual and hypothetical examples illustrate some exemplary implementations of the present invention: Unless specified otherwise, all percentages are by weight.

| Example No. | Litter Substrate Granules | Substrate Weight | Weight of Fragrance Nanoemulsion | Fragrance Weight % |
|---|---|---|---|---|
| 1 | 10-40 clay with active carbon | 275.59 g | 1.79 g | 0.65% |
| 2 | 8-50 clay | 286.33 g | 2.09 g | 0.73% |
| 3 | limestone | 455.29 g | 2.02 g | 0.44% |

Each litter substrate of Examples 1-3 was coated by spraying with a nanoemulsion having the composition below:

| | |
|---|---|
| Fragrance oil | up to 6% |
| Surfactant blend | 10-50% |
| Polyol | 15-40% |
| Ethanol | up to 30% |

The fragrance nanoemulsion was sprayed onto a thin (not more than 3 to 4 granules deep) material spread out in 12"×6"×4.5" litter boxes atop a scale to measure fragrance administered. The fragrance was air dried onto the substrate material for 1 hour prior to scent testing.

Each dried example was qualitatively tested for fragrance characteristics using the following qualitative criteria and as recorded in the table below:
1—No detectable scent
2—faint or barely detectable scent
3—readily detectable scent
4—strong scent
5—very strong scent

| Example No. | After 1 hr | After 3 hrs | After 2.5 days (60 hrs) |
|---|---|---|---|
| 1 | 2 | 1 | 1 |
| 2 | 3 | 2 | 2 |
| 3 | 4 | 4 | 3 |

Each dried example was then qualitatively tested for fragrance characteristics by administering 10-15 ml of water to a small amount of material (e.g., about 40 g). Example 1 exhibited a scent strength that was significantly stronger when wet than when dry. The scent was still readily observable 2.5 days after redrying at room temperature and humidity. Example 2 exhibited a scent strength that was significantly stronger when wet than when dry. The scent was still detectable after redrying at room temperature and humidity. Example 3 showed no significant difference between scent strength upon wetting as compared to when dry (i.e., both exhibit a readily detectable scent).

Example 4

The nanoemulsion of Example 4 included ⅔ by weight of a first part comprising a "blue slurry" including sodium borate pentahydrate ($Na_2B_4O_7 \cdot 5H_2O$) and ⅓ by weight of a second part including:

| | | |
|---|---|---|
| 1 g fragrance oil "Purr-fect" | | 4.94% |
| 10 g Polysorbate Tween 20 | | 49.38% |
| 5 g Propylene Glycol | | 24.69% |
| 4.25 g ethanol | | 20.99% |

The "blue slurry" composition was as follows:

| | |
|---|---|
| Water | 70-90% |
| $Na_2B_4O_7 \cdot 5H_2O$ | 5-15% |
| Boric Acid | up to 5% |
| Sodium hydroxide (buffer) | as needed |
| Dye | adjusted for desired pigmentation |

Although all the water was present within the "blue slurry" first part of the composition for convenience and cost, at least some of the water could be present within the second part or the nanoemulsion itself, up to infinite dilutions. The nanoemulsion of Example 4 included a molar ratio of borate:polyol of about 1:2.

It was observed that the fragrance oil remains in solution within the nanoemulsion with no separation into oil/water phases. No miscibility issues were noted. The nanoemulsion was applied by spraying in a similar manner as described above relative to Examples 1-3.

Example 5

Figure 1B:
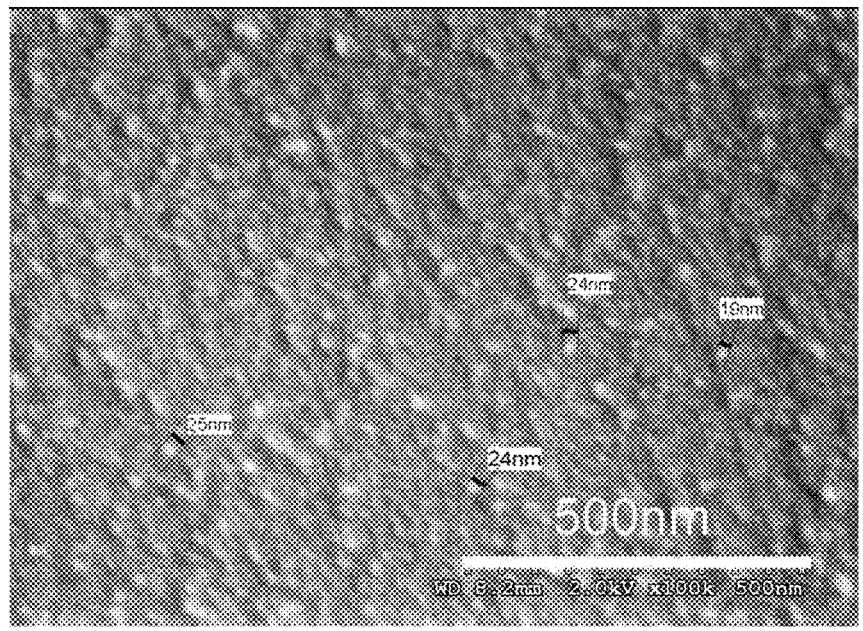
FIG. 1B is a more magnified SEM image of the exemplary fragrance nanoemulsion of FIG. 1A over a glass substrate.
Figure 2A:
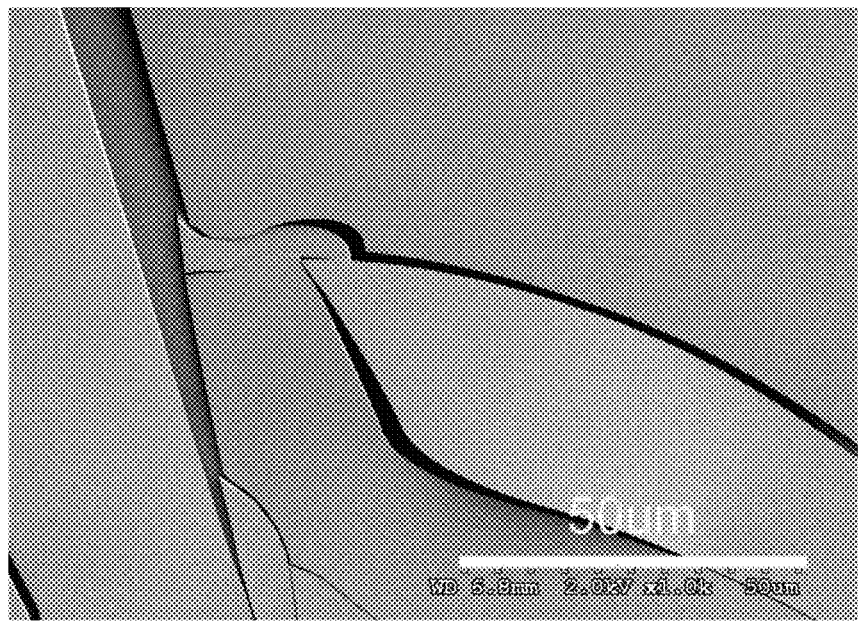
FIG. 2A is an SEM image of a borate solution applied over a glass substrate.
Figure 2B:
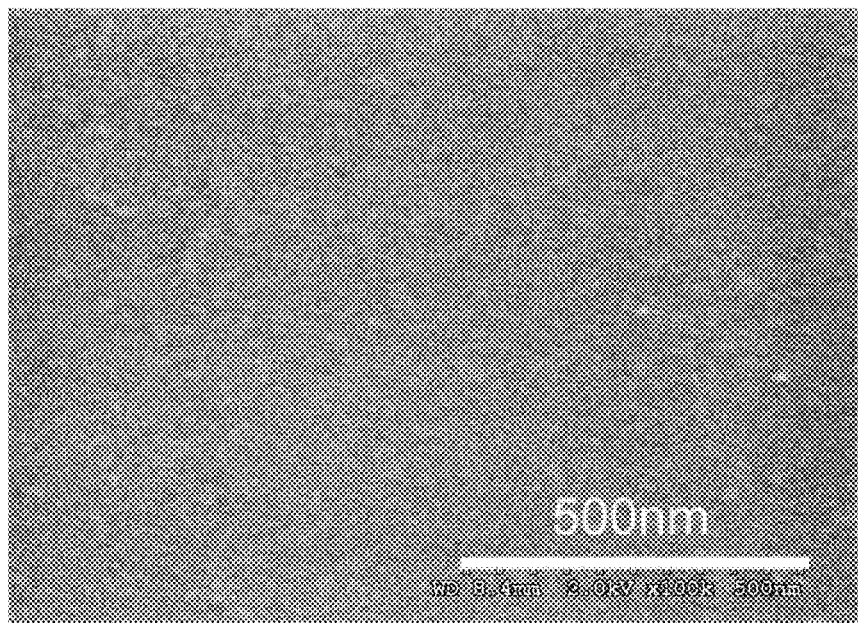
FIG. 2B is a more magnified SEM image of the borate solution of FIG. 2A.

Experiments were conducted to illustrate formation of a flexible, plasticized (i.e., non-brittle) film including nano-sized particles on substrate surfaces coated with a fragrance nanoemulsion. A drop of fragrance nanoemulsion was placed on a 1 inch square cover glass slide and was spread evenly using a clean spatula. The glass slide provides a relatively smooth surface for easy microscopy observation on the behavior of the nanoemulsion film. After the glass slide was completely dried at room temperature, an iridium metallic thin film (less than about 5 nm in thickness) was applied on the glass slide using a Denton Desk IV sputter coater. This thin film produces an electrically conductive layer on the samples to prevent charge build up. The sample was examined in a Hitachi S-4300SE scanning electron microscope (SEM) at an accelerating voltage of 2 KV. For purposes of comparison, another slide was prepared using a solution with borate but no fragrance nanoemulsion. FIGS. 1A-1B show the sample with the fragrance nanoemulsion on the glass surface. This sample appears as a flexible, plasticized film adhering firmly to the glass surface. The film comprises nano-sized particles of about 10 nm to about 50 nm in diameter. The comparative example shown in FIGS. 2A-2B includes a relatively thick, brittle film ready to break away from the glass substrate (see FIG. 2A).

In order to determine whether fragrance oil was still present within the sample of FIGS. 1A-1B after exposure to the high vacuum of the SEM chamber, the sample was wetted with a drop of water immediately following its removal from the SEM chamber. A noticeable fragrant scent was detected upon wetting.

Example 6

Figure 3A:
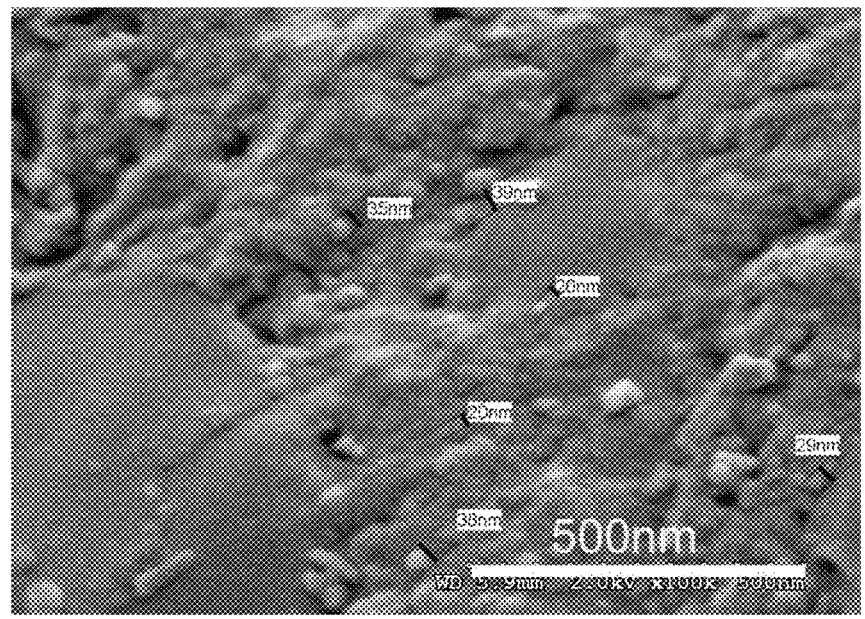
FIG. 3A is an SEM image of an exemplary fragrance nanoemulsion applied over a clay litter substrate.
Figure 3B:
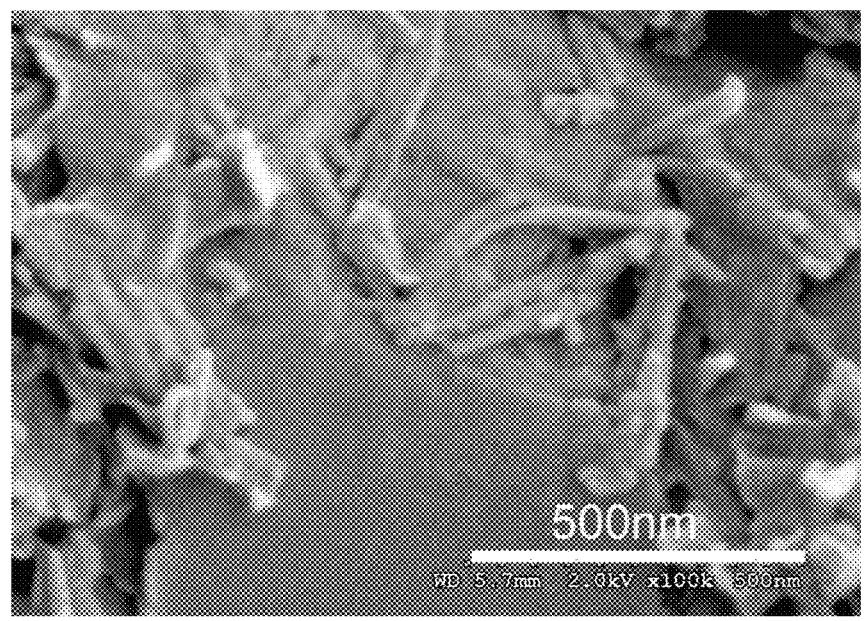
FIG. 3B is an SEM image of a borate solution applied over a clay litter substrate.

Experiments were conducted to illustrate formation of a flexible, plasticized film including nano-sized particles on clay litter substrate granules coated with a fragrance nanoemulsion. A sample of clay litter was sprayed with the fragrance nanoemulsion used in Example 5. The clay granules were dried at room temperature. A sample was prepared for SEM observation following the same steps as in Example 5. Similarly, a sample of clay litter was sprayed with a borate solution without any fragrance nanoemulsion. This sample was also prepared for SEM observation following the same steps as in Example 5. FIG. 3A shows the presence of nano-sized particles on the clay litter substrate surface, which was sprayed with fragrance nanoemulsion. These fragrance oil droplets or particles ranged in size from about 10 nm to about 50 nm in diameter. This layer of particles appeared to adhere well and follow the contour of the clay surface. In contrast, no nano-sized particles were observed on the clay sprayed with borate solution (FIG. 3B)

Based on the SEM observations of FIGS. 1A-3B associated with Examples 5 and 6, the fragrance nanoemulsion generates a flexible, plasticized non-brittle film including nano-sized particles or droplets which adhere strongly to the substrate to which the nanoemulsion is applied and dried.

One will appreciate in light of the disclosure herein that the present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A litter composition, comprising:
a litter substrate in the form of granules; and
a stable fragrance coating adhered over at least some of the litter substrate granules wherein:
the stable fragrance coating is a water-soluble nanoemulsion that comprises an aqueous surfactant continuous phase, said surfactant comprising a polyol and a fragrance oil dispersed phase, said fragrance oil dispersed phase containing nano-sized droplets having a diameter of no more than about 100 nm of fragrance oil;
the dispersed phase is dispersed within the continuous phase so that the continuous phase encapsulates the nano-sized droplets of fragrance oil;
wherein the stable fragrance coating releases a portion of the nano-sized droplets of fragrance oil upon wetting and reforms upon drying.

2. The composition of claim 1, wherein the nano-sized droplets of fragrance oil have a diameter of no more than about 50 nm.

3. The composition of claim 1, wherein the nano-sized droplets of fragrance oil have a diameter within a range of about 20 nm to about 30 nm.

4. The composition of claim 1, wherein the nano-sized droplets of fragrance oil comprise between about 0.1 percent and about 50 percent by weight of the nanoemulsion.

5. The composition of claim 1, wherein the litter substrate comprises active carbon.

6. The composition of claim 1, wherein the nanoemulsion coating is a dry coating adhered to the litter substrate granules.

7. The composition of claim 1, wherein the aqueous surfactant continuous phase comprises a hydrophilic nonionic surfactant with an HLB value of at least about 10.

8. The composition of claim 1, wherein the polyol comprises at least one polyol selected from the group consisting of mannitol, glycerin, propylene glycol, and sorbitol.

9. A method of manufacturing a litter composition comprising:
providing a nanoemulsion including an aqueous surfactant continuous phase said surfactant comprising a polyol and a dispersed phase comprising one or more fragrance oils, the fragrance oil dispersed phase being dispersed within the continuous phase so that the continuous phase encapsulates the fragrance oil, the fragrance oil dispersed phase comprising fragrance oil droplets having a diameter of no more than about 100 nm;
coating the nanoemulsion over at least some litter granules of a litter substrate comprising litter granules;
drying the nanoemulsion coated litter granules so as to remove at least a portion of the aqueous continuous phase such that the nanoemulsion forms a stable, plasticized encapsulated fragrance coating that releases fragrance oil upon wetting, and which reforms a stable plasticized encapsulated fragrance coating over the litter granules upon redrying.

10. The method of claim 9, wherein the nanoemulsion coating is applied over the litter substrate granules by spraying.

11. The method of claim 9, wherein the nanoemulsion is substantially clear.

12. A litter composition, comprising:
a litter substrate in the form of granules; and
a stable nanoemulsion coated over at least some of the litter substrate granules, the nanoemulsion including:
an aqueous surfactant continuous phase comprising water, a surfactant comprising a polyol, and a borate; and
a dispersed phase comprising one or more fragrance oils wherein the fragrance oil dispersed phase is dispersed within the continuous phase so that the continuous phase encapsulates the fragrance oil, the fragrance oil dispersed phase comprising fragrance oil droplets having a diameter of no more than about 100 nm;
wherein the borate within the aqueous continuous phase complexes with the surfactant so as to further stabilize the components of the nanoemulsion.

13. The composition of claim 12, wherein the borate comprises at least one of boric acid or a borate salt.

14. The composition of claim 13, wherein the borate comprises at least one borate salt selected from the group consisting of sodium borate, potassium borate, magnesium borate, calcium borate, and manganese borate.

15. The composition of claim 12, wherein the borate comprises Na2B4O7.5H2O.

16. The composition of claim 12, wherein the polyol comprises at least one polyol selected from the group consisting of mannitol, glycerin, propylene glycol, and sorbitol.

17. The composition of claim 12, wherein the molar ratio of the borate to the polyol is between about 1:1 and about 1:15.

18. The composition of claim 12, wherein the molar ratio of the borate to the polyol is between about 1:1 and about 1:8.

* * * * *